(No Model.) 3 Sheets—Sheet 1.
H. BITNER.
PEDAL MOVEMENT FOR BICYCLES.
No. 510,671. Patented Dec. 12, 1893.
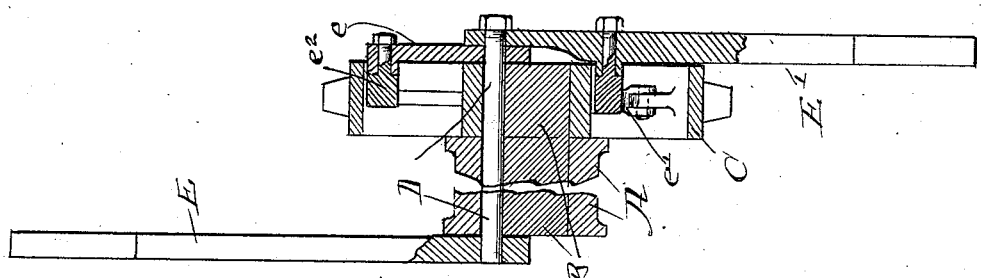
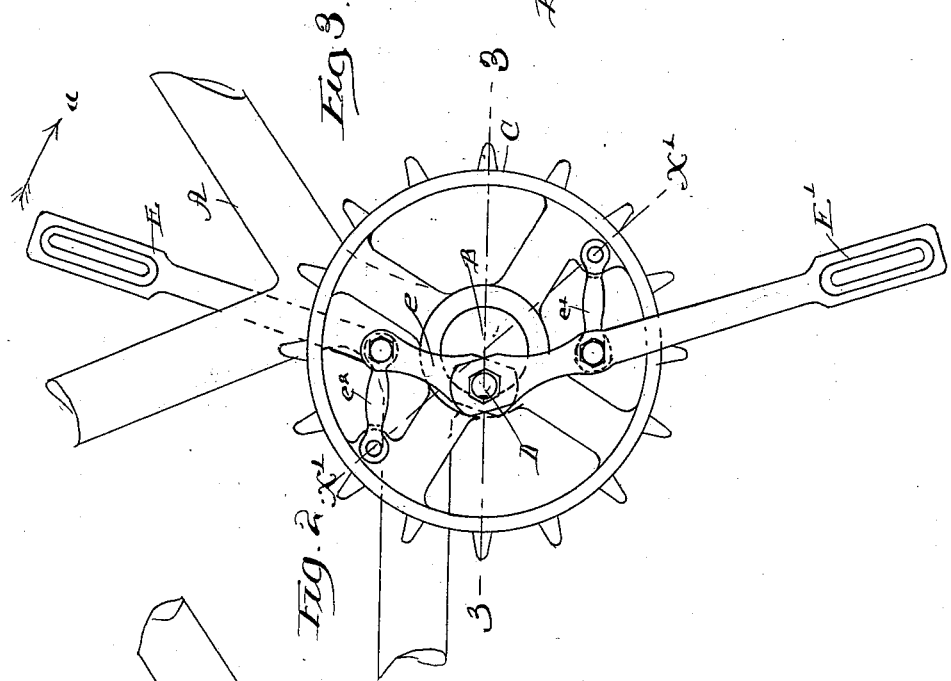
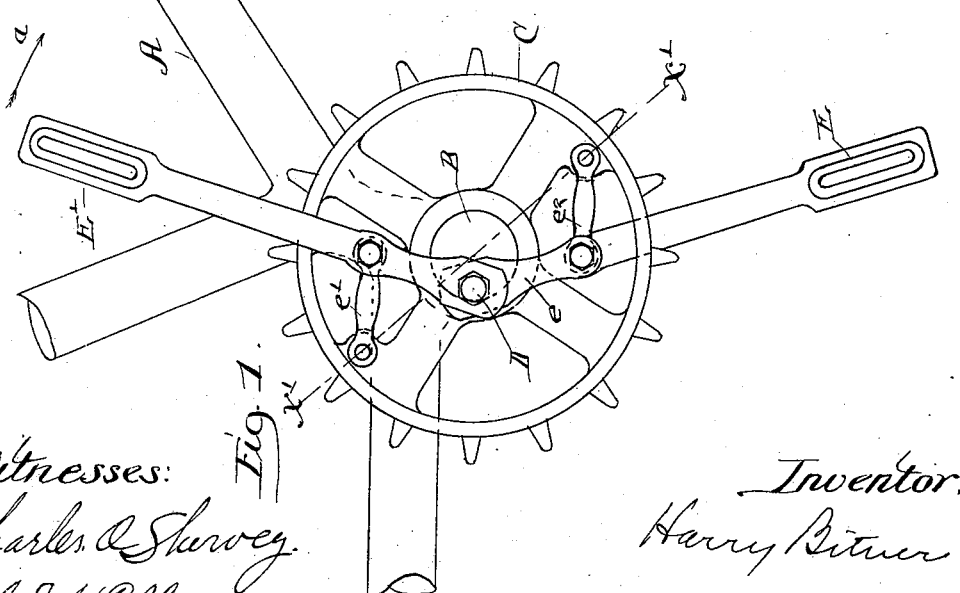
Witnesses:
Charles O. Survey
A. J. H. Ebersen
Inventor:
Harry Bitner

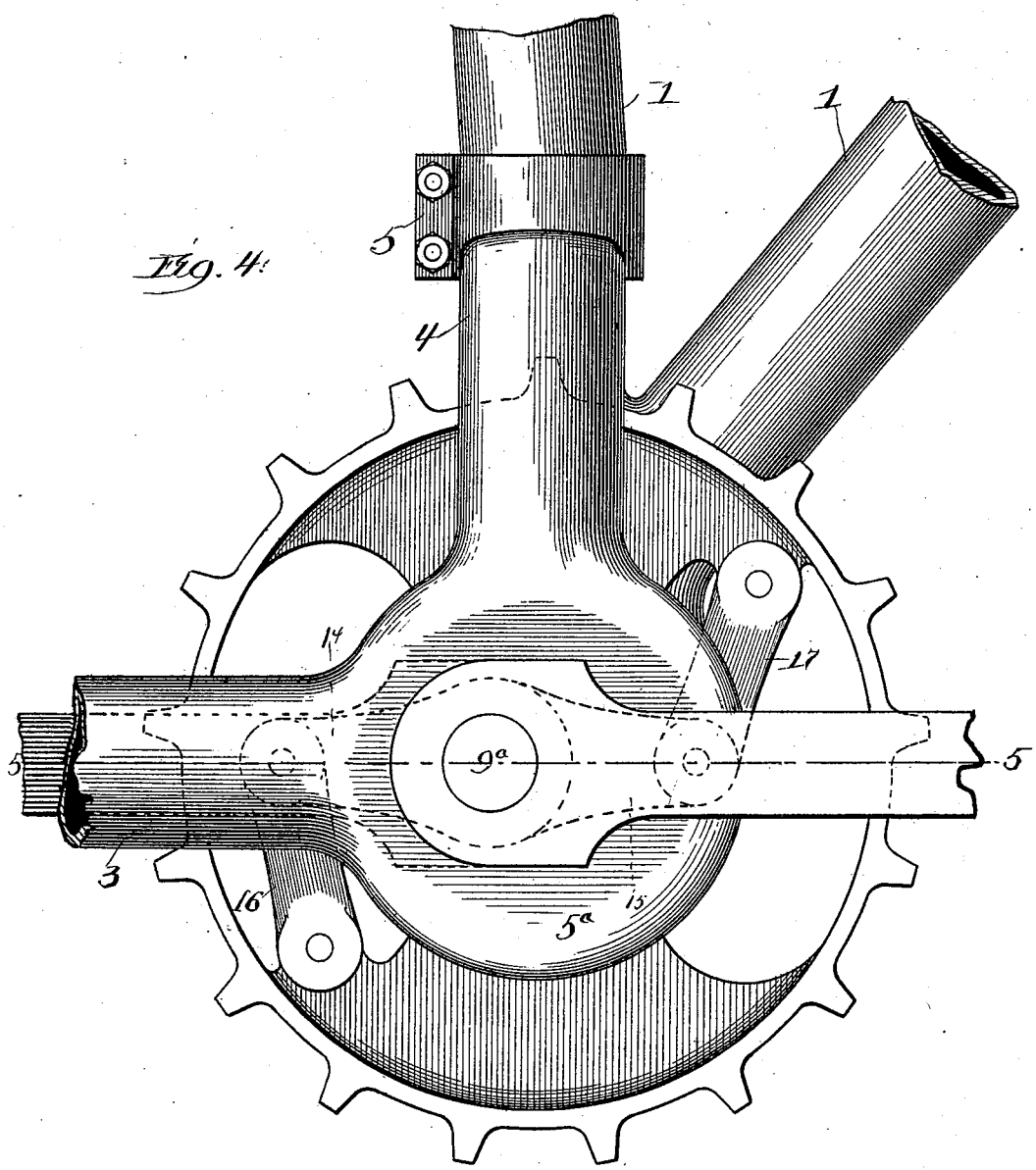

(No Model.)  3 Sheets—Sheet 3.
H. BITNER.
PEDAL MOVEMENT FOR BICYCLES.
No. 510,671. Patented Dec. 12, 1893.
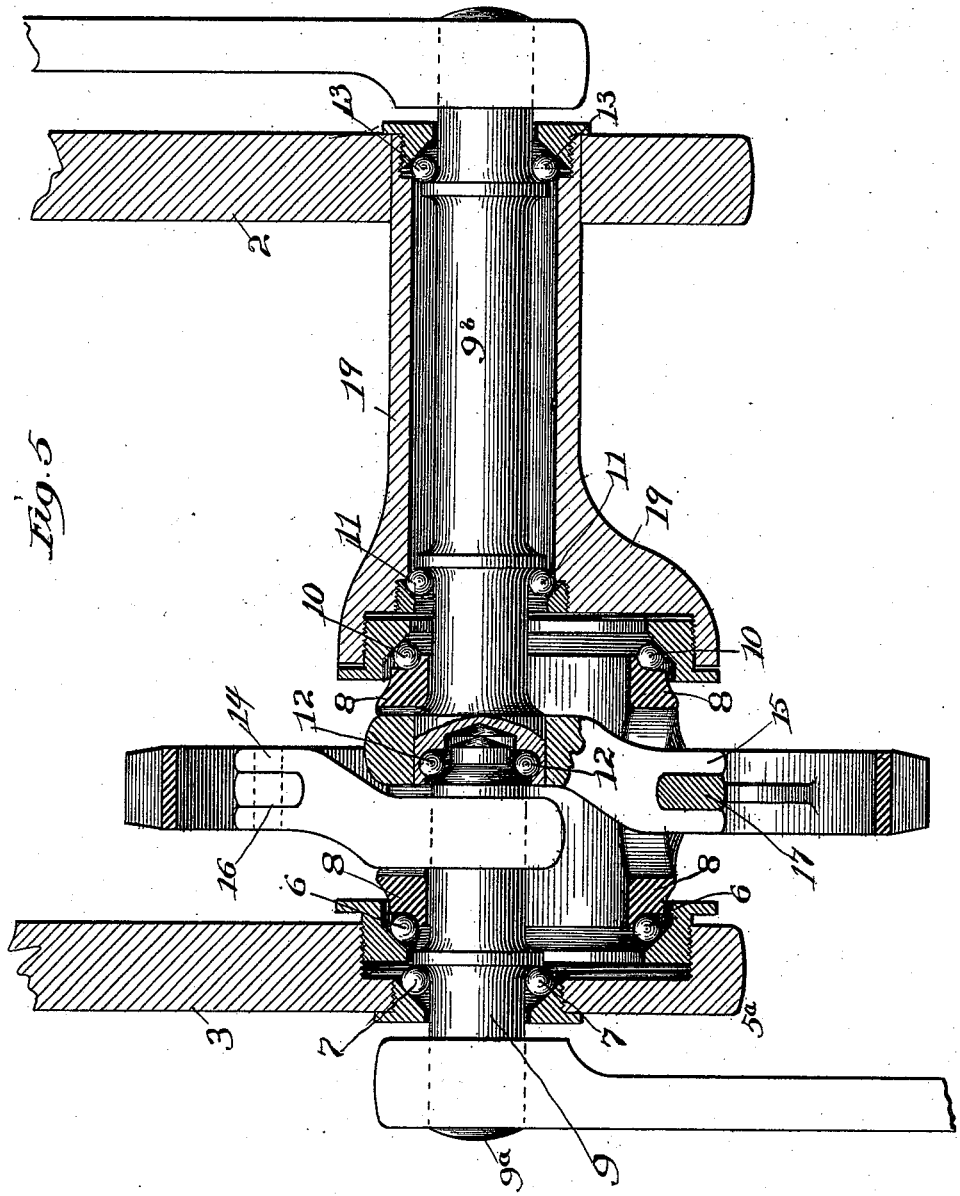

UNITED STATES PATENT OFFICE.

HARRY BITNER, OF CHICAGO, ILLINOIS.

PEDAL-MOVEMENT FOR BICYCLES.

SPECIFICATION forming part of Letters Patent No. 510,671, dated December 12, 1893.

Application filed October 1, 1892. Serial No. 447,464. (No model.)

*To all whom it may concern:*

Be it known that I, HARRY BITNER, a citizen of the United States of America, residing at Chicago, in the county of Cook and State of Illinois, have invented a certain new and useful Pedal-Movement for Bicycles, of which the following is a specification.

My invention relates to certain improvements applicable particularly to bicycles, but also of use in other mechanisms.

The purpose of the improvement is to do away with the dead center and consequent loss of power which occurs when both cranks and the line in which the force is applied coincide and lie in one and the same straight line, so that the push upon both pedals is sustained entirely by the crank pivot, and none of it applied to rotate the wheel.

In the drawings presented herewith, Figures 1, 2, and 3 show a simple construction to illustrate the fundamental principles of the mechanism to which my improvements are applied; and Figs. 4 and 5 illustrate the improvements, which I have made upon the mechanism shown in Figs. 1, 2 and 3. Figs. 1 and 2 are side elevations of that portion of a safety bicycle which contains the sprocket-wheel, Fig. 2 showing the parts in a different position from that in Fig. 1. Fig. 3 is a cross section in line 3—3, of Fig. 2, but showing the cranks at right angles to the former figure. Fig. 4 is a view similar to Figs. 1 and 2; and Fig. 5 is a horizontal section in line 5—5, of Fig. 4.

In the illustration of my invention I have chosen to show its application to the class of bicycles in which the power is applied through the cranks to a sprocket-wheel and from that transmitted to the rear wheel of the bicycle by means of a chain. There is nothing in the nature of the improvement, however, that will hinder its application to any of the machines in which the power is applied directly to one of the supporting wheels of the bicycle.

The peculiar advantages of my invention, as well as the general construction thereof, will be more readily understood by looking, first, at Figs. 1, 2, and 3, in which the simpler application is illustrated.

Applying reference letters to the parts, the frame-work of the bicycle is lettered A, and carries a stud, B, rigid therewith. Upon this stud turns the sprocket-wheel, C, by means of which power is transmitted to the wheels of the bicycle, and said stud is bored eccentrically to enable a shaft, D, to be journaled therein. This shaft has one of the cranks, E, rigidly fastened thereto upon the opposite side of the frame from the sprocket-wheel, C, and upon the same side of the frame has an arm, $e$, also rigidly fastened to the shaft and preferably in line with the crank, E, so that said arm will have the same movement about the common center as the pedal crank, E. The other pedal crank, E', is loosely pivoted upon the shaft, D, so as to turn upon the same center as the first crank, but to be capable of motion independent thereof. At a sufficient distance from the shaft, D, the pedal crank, E', and the arm, $e$, are respectively connected with the sprocket-wheel by means of links $e'$, $e^2$. The motion of the cranks is in the direction of the arrows, $a$, and the operation of the device in overcoming the dead center will be seen by a comparison of Figs. 1 and 2. In the former figure the crank, E', is uppermost and the crank, E, below, while in the latter figure the crank, E, is uppermost and the crank, E', is below, so that in passing from one position to another the two cranks have changed places. But looking at the line $x$, $x'$, which passes through the pivots of the links, $e'$, $e^2$, it will be seen that the interchange of positions of the cranks has turned the sprocket-wheel exactly one half way around. It is obvious, of course, that the next semi-revolution of the wheel will return both cranks, E', to their original positions, so that no dead center will exist.

While the same principles are made use of in the construction shown in Figs. 4 and 5, as in that of the figures already described, said latter figures also show certain improvements in the way of arrangement of parts to enable ball-bearings to be applied to the various moving portions without unnecessarily enlarging the journals of the sprocket-wheel. In said Figs. 4 and 5, the main frame of the bicycle is shown at 1, and at 2, 3 are seen a pair of braces which have been heretofore commonly used, extending from the sprocket-wheel journals to the rear wheel of the bicycle, and one of these, 3, has an upward extension, 4, clamped at 5, to the main frame. The forward portion of the brace, 3, and the lower end of the extension, 4, are connected by a circular box, 5ª, in which are two sets of ball-bearings, 6, 7, of well known form, located eccentrically with respect to each other, the bearing, 6, being adapted to carry one end of a sprocket-wheel hub, 8; and the other bearing, 7, being adapted to carry one end of a crank-shaft, 9. Opposite to these bearings and in the main frame of the bicycle are a second pair of bearings, 10, 11, corresponding to the bearings, 6, 7, the bearing, 10, being adapted to carry the other end of the sprocket-wheel hub, and the bearing, 11, to carry another portion of the crank-shaft. Said shaft is divided within the hub, 8, into two portions, 9ª, 9ᵇ, capable of turning with respect to each other upon a set of bearings, 12, and in view of this divided shaft, still another set of bearings, 13, is provided to prevent the shaft from cramping upon the bearings, 12.

It is not thought necessary to specifically describe the ball-bearings here shown, for the reason that they are common and of well known form and will be readily understood from the drawings by any one familiar with such matters. It might be noticed, however, that the bearings, 11, and 12, and are not provided with means for adjustment for the reason that they are laterally adjustable and opposite to the bearings, 13 and 7, respectively, which are made adjustable.

The hub, 8, of the sprocket-wheel is made hollow, and also has radial openings through its middle portion; and the two portions of the crank-shaft are provided with radial arms, 14, 15, extending through these openings and having at their ends links, 16, 17, pivoted thereto, and also to the sprocket-wheel.

In operation, the construction of Figs. 4 and 5, does not vary essentially from that of Figs. 1, 2, and 3, one of the cranks being always forward of the crank-axis because of the location of said axis in rear of that of the sprocket-wheel.

I claim as new and desire to secure by Letters Patent—

1. In a pedal movement, the combination with a hollow hubbed wheel having radial openings through its middle portion, of bearings at the opposite ends of said hub, a divided crank shaft journaled eccentrically in said bearings and passing through the hub, arms upon the respective portions of said shaft extending through the openings in the hub, and means of engagement between the arms and the wheel adapted to permit a substantially radial movement of the arms with respect to the wheel, substantially as described.

2. In a pedal movement, the combination with a hollow hubbed wheel having radial openings through its middle portion, of bearings at opposite ends of said hub, a divided crank-shaft journaled eccentrically in said bearings and passing through the hub, arms upon the respective portions of said shaft extending through the radial openings in the hub, and links pivoted at one end to said arms, and at the other end to the wheel; substantially as described.

HARRY BITNER.

Witnesses:
A. I. H. EBBESEN,
CHARLES O. SHERVEY.